(12) United States Patent
Iida et al.

(10) Patent No.: US 6,279,523 B1
(45) Date of Patent: Aug. 28, 2001

(54) VALVE DRIVING APPARATUS PROVIDED IN AN INTERNAL COMBUSTION ENGINE

(75) Inventors: Tatsuo Iida; Takashi Izuo; Masahiko Asano; Hiroyuki Hattori, all of Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/428,494

(22) Filed: Oct. 28, 1999

(30) Foreign Application Priority Data

Oct. 29, 1998 (JP) .................................................. 10-309055

(51) Int. Cl.⁷ .............................. F01L 9/04; F02D 13/02
(52) U.S. Cl. ..................................... 123/90.11; 123/90.15
(58) Field of Search ............................... 123/90.11, 90.15

(56) References Cited

U.S. PATENT DOCUMENTS

| | | | | |
|---|---|---|---|---|
| 4,794,891 | * | 1/1989 | Knobloch ........................ | 123/90.11 |
| 5,596,956 | * | 1/1997 | Ogawa et al. ................... | 123/90.11 |
| 5,671,705 | * | 9/1997 | Matsumoto et al. ............. | 123/90.11 |
| 5,782,211 | * | 7/1998 | Kamimaru ....................... | 123/90.11 |
| 6,176,208 | * | 1/2001 | Tsuzuki et al. ................... | 123/90.11 |

FOREIGN PATENT DOCUMENTS

| | | |
|---|---|---|
| 195 26 681 A1 | 1/1997 | (DE) . |
| 197 14 518 A1 | 10/1998 | (DE) . |
| 9-88645 | 3/1997 | (JP) . |
| 10-18819 | 1/1998 | (JP) . |
| 10-18820 | 1/1998 | (JP) . |
| 10-288015 | 10/1998 | (JP) . |

\* cited by examiner

Primary Examiner—Weilun Lo
(74) Attorney, Agent, or Firm—Finnegan, Henderson, Farabow, Garrett & Dunner, LLP

(57) ABSTRACT

The present invention offers a valve driving apparatus provided in an internal combustion engine. The valve driving apparatus drives an exhaust valve by using electromagnetic force. The exhaust valve is movable between an open position and a closed position. The valve driving apparatus includes an armature coupled with the exhaust valve, an electromagnetic coil for generating an electromagnetic force exerted on the exhaust valve, and a control means for controlling the electromagnetic force applied to the armature in the direction of the closed position of the exhaust valve when the exhaust valve is moving to the open position, in the fuel injection cut control, that is, combustion is suspended in the internal combustion engine. The present invention also offers a method for driving the exhaust valve, which comprises the steps of driving the electric current through the electromagnetic coil, biasing the armature and controlling the electromagnetic force applied to the armature.

8 Claims, 8 Drawing Sheets

VALVE DRIVING APPARATUS PROVIDED IN AN INTERNAL COMBUSTION ENGINE

FIELD OF THE INVENTION

The present invention relates to a valve driving apparatus provided in an internal combustion engine. Especially, the valve driving apparatus drives an exhaust valve by using an electromagnetic force, and it is appropriate for the exhaust valve to function to be movable between an open and a closed position.

BACKGROUND OF THE INVENTION

A valve driving apparatus which drives an exhaust valve by using electromagnetic force is already known, as disclosed in Japanese Laid-Open Patent Application No. 10-18819 or No. 10-18820. An armature is coupled with an electromagnetic valve (or called exhaust valve) which is provided in this valve driving apparatus. On the upper side of the armature, the first electromagnet and an upper spring are deposited, and on the lower side of the armature, the second electromagnet and a lower spring are deposited. The armature is held at the neutral position in the middle between the first and second electromagnets by the forces of the upper and lower springs. The electromagnetic valve is full closed when the armature touches the first electromagnet, and the electromagnetic valve is full open when the armature touches the second electromagnet. In the above-mentioned valve driving apparatus, the exhaust valve is held at the full closed position by the fact that a predetermined exciting current is supplied to the first electromagnet and the armature is attracted by the first electromagnet. When the supply of the exciting current to the first electromagnet is cut, the armature is pushed by the upper spring and the exhaust valve begins to move in the opening direction. If a predetermined exciting current is supplied to the second electromagnet when the exhaust valve is positioned at a predetermined position, a damping of displacement amplitude by friction of the exhaust valve or remaining pressure of combustion is supplemented and the exhaust valve reaches the full open position by the fact that the electromagnetic force is supplied to the armature in the opening direction.

If the exhaust valve is moving at a high speed when the exhaust valve arrives at the full open position, that is, the armature touches the second electromagnet, such problems as increasing of activating noise of the exhaust valve or bouncing back of the exhaust valve occur. Therefore, in the aforementioned valve driving apparatus, the speed of the exhaust valve is restrained when the exhaust valve approaches to the full open position, by reducing the exciting current to the second electromagnet when the exhaust valve reaches near the full open position.

Incidentally, in the internal combustion engine installed on a vehicle, when an accelerator pedal is disengaged during the high speed driving, for example, a fuel injection cut control for stopping a fuel injection to a combustion chamber of the engine is executed. Because combustion does not occur in the process of the fuel injection cut control, the pressure in the combustion chamber of the engine is negative (or called vacuum) when the exhaust valve is at the opening timing, that is, a piston of the engine is near bottom dead center. This negative pressure forces the exhaust valve in the opening direction. Consequently, if the same value of the exciting current is supplied to the second electromagnet in the execution of the fuel injection cut control, the armature touches the second electromagnet at the higher speed. Consumed electric energy increases, because it is necessary to supply the exciting current again to pull the armature back to the second electromagnet in order to prevent the armature from bouncing back. Furthermore, a large noise occurs by the high speed collision between the armature and the second electromagnet.

SUMMARY OF THE INVENTION

It is thus one object of the present invention to solve the aforementioned problems. The present invention provides a valve driving apparatus for driving an exhaust valve, using electromagnetic force, provided in an internal combustion engine. The exhaust valve is movable between an open position and a closed position. The valve driving apparatus has an armature coupled with the exhaust valve, an electromagnetic coil for generating an electromagnetic force exerted on the armature, a valve spring for generating a force exerted on the exhaust valve, and a control means. The control means controls the electromagnetic force applied to the armature in the direction of the closed position of the exhaust valve when the exhaust valve is moving to open, in the case that combustion is suspended because of a fuel injection cut control in the internal combustion engine.

This control means supplies the electromagnetic force to the armature coupled with the exhaust valve in the direction of the closed position, when the exhaust valve is moving to the open position, in the case that combustion does not occur in the engine. When combustion is suspended in the engine, negative pressure is generated in the combustion chamber of the engine at the timing near the bottom dead center which is the opening timing of the exhaust valve. The force applied to the exhaust valve by the negative pressure is canceled by the electromagnetic force in the direction of the closed position applied to the armature by the control means. Consequently, the armature is prevented from colliding with the electromagnet at high speed. Therefore, the armature does not bounce back from the electromagnet, and the activating noise of the exhaust valve can be restrained. When combustion is suspended in the fuel injection cut control, an engine brake occurs on the basis of the negative pressure of the combustion chamber. Then, the engine brake is obtained securely by the present invention.

The above-mentioned object is achieved by another embodiment of the present invention. That embodiment is also a valve driving apparatus for driving an exhaust valve, using electromagnetic force, provided in an internal combustion engine. The exhaust valve is movable between an open position and a closed position, in the same way as depicted in the first embodiment. The valve driving apparatus has an armature coupled with the exhaust valve, an electromagnetic coil for generating an electromagnetic force exerted on the armature, a valve spring for generating a force exerted on the exhaust valve, and a valve timing changing means. The valve timing changing means changes an opening timing of the exhaust valve, in the case that combustion is suspended in the internal combustion engine.

Generally speaking, the combustion chamber pressure is negative near the bottom dead center which is the opening timing of the exhaust valve, when combustion is suspended in the engine. However, since the valve timing changing means in this embodiment changes an opening timing (advanced or delayed) of the exhaust valve, when combustion is suspended in the engine, the pressure in the combustion chamber is restrained low negative (that is, near zero), or becomes positive. Consequently, the armature does not collide with the electromagnet at high speed. Therefore, it prevents the armature from bouncing back from the electromagnet, and the activating noise of the exhaust valve can be restrained. Since extra electromagnetic force to the armature is not necessary, electric power can be saved.

The above-mentioned object is also achieved by another embodiment of the present invention. That embodiment is also a valve driving apparatus for driving an exhaust valve, using electromagnetic force, provided in an internal combustion engine. The exhaust valve is also movable between an open position and a closed position. The valve driving apparatus has an armature coupled with the exhaust valve, an electromagnetic coil for generating an electromagnetic force exerted on the armature, a valve spring for generating a force exerted on the exhaust valve, and a reducing control means. The reducing control means controls the electromagnetic force applied to the armature in the direction of the open position of the exhaust valve when combustion is suspended in the engine less than when combustion is underway in the engine.

Since the electromagnetic reducing means controls the electromagnetic force on the armature in the direction of the open position of the exhaust valve when combustion is suspended in the engine less than when combustion is underway in the engine, the electromagnetic force in the direction of the open position of the exhaust valve is reduced. Consequently, the armature does not collide against the electromagnet at high speed. Therefore, the armature does not bounce back from the electromagnet, and the activating noise of the exhaust valve can be restrained. Since extra electromagnetic force to the armature is not necessary, electric power can be saved. Furthermore, since the combustion chamber pressure in the engine is negative, therefore the engine brake can be secured.

Furthermore, the above-mentioned object is also achieved by another embodiment of the present invention. That embodiment is also a valve driving apparatus for driving an exhaust valve, using electromagnetic force, provided in an internal combustion engine. The exhaust valve is also movable between an open position and a closed position. The valve driving apparatus has an armature coupled with the exhaust valve, an electromagnetic coil for generating an electromagnetic force exerted on the armature, a valve spring for generating a force exerted on the exhaust valve, and a suspending means. The suspending means suspends a moving of the exhaust valve when combustion is suspended in the engine.

Since the suspending means suspends a moving of the exhaust valve when combustion is suspended in the engine, the armature coupled with the exhaust valve does not collide against a magnet at high speed. Moreover, an exciting current to the electromagnetic coil for attracting the armature can be reduced, therefore saving of an electric power can be attained.

BRIEF DESCRIPTION OF THE DRAWINGS

The above and other objects, features, advantages and technical and industrial significance of this invention will be better understood by reading the following detailed description of a presently preferred embodiment of the invention, when considered in connection with the accompanying drawing, in which.

DESCRIPTION OF THE PREFERRED EMBODIMENTS

Figure 1:
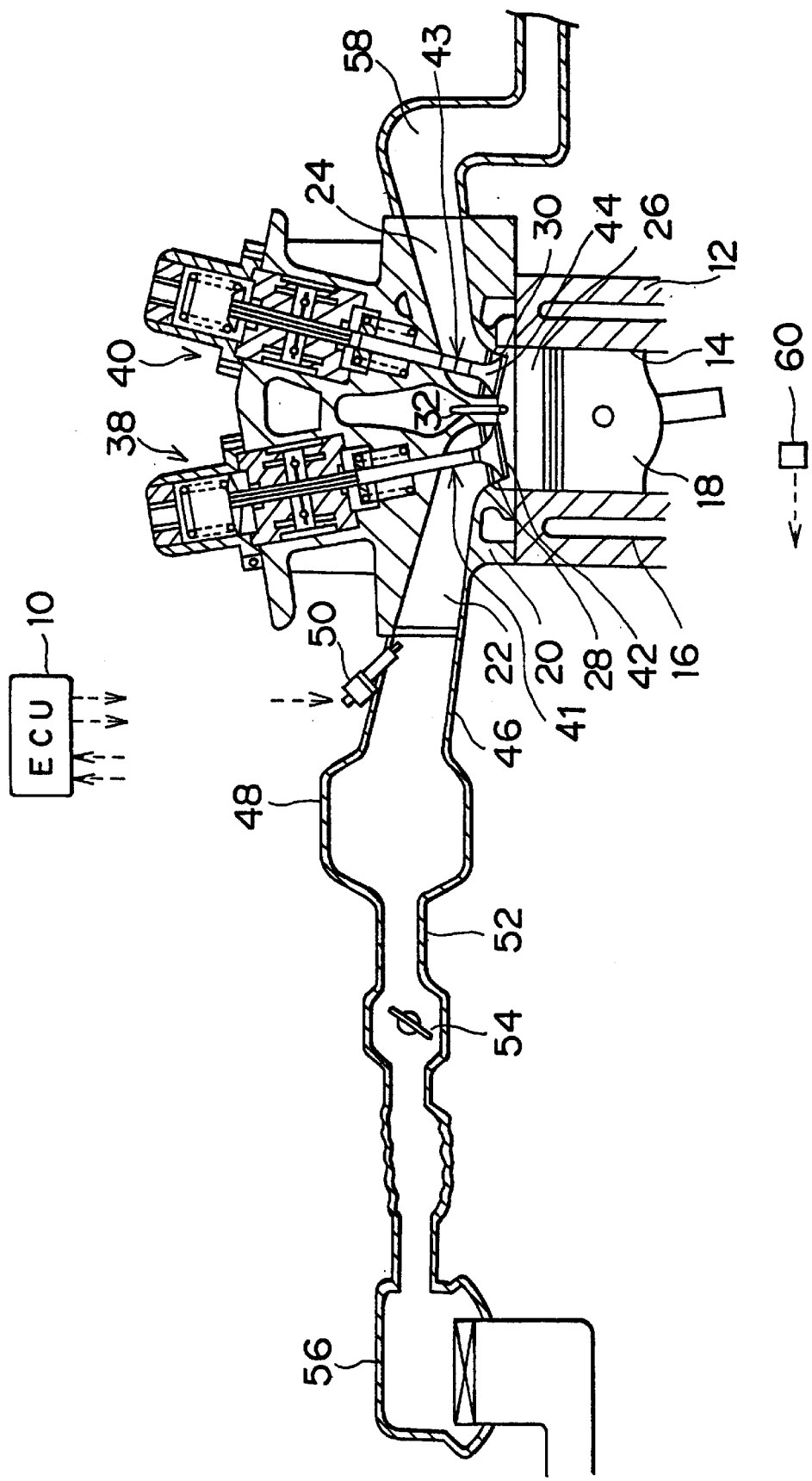
FIG. 1 is a part of a cross-sectional view of an internal combustion engine operated by the valve driving apparatus according to the present invention.

In the following and the accompanying drawings, the present invention will be described in more detail in terms of the embodiments. Initially, the basic structure of a control device concerning this invention is explained. This valve driving apparatus of the present invention is controlled by an ECU 10, as shown in FIG. 1. An cylinder block 12 is provided in an internal combustion engine (hereinafter called only engine), and a cylinder 14 and a water jacket 16 are deposited in the cylinder block 12. The engine of this embodiment is multi-cylinder internal combustion engine which includes a plurality of cylinders, however, only one cylinder 14 is illustrated in FIG. 1.

A piston 18 is inside the cylinder 14. The piston 18 can slide and move up-and-down as shown in FIG. 1. A cylinder head 20 is fixed to the cylinder block 12 on the upper side. In each cylinder head 20, an intake port 22 and an exhaust port 24 are respectively shaped.

A combustion chamber 26 is shaped by the lower surface of the cylinder head 20, the upper surface of the piston 18, and the side wall of the cylinder 14. The above-mentioned intake port 22 and exhaust port 24 respectively connect to the combustion chamber 26. A valve seat 28 is shaped at the opening edge of the intake port 22 toward the combustion chamber 26. A valve seat 30 is also shaped at the opening edge of the exhaust port 24 toward the combustion chamber 26. The tip of an ignition plug 32 extrudes into the combustion chamber 26.

Electromagnetic actuators 38, 40 included in the valve driving apparatus are deposited in the cylinder head 20. More specifically, the electromagnetic actuator 38 functions for intake of fuel and air to the combustion chamber 26, and the actuator 40 functions for exhaust of fuel and air from the combustion chamber 26. As shown in FIG. 1, the intake electromagnetic actuator 38 has an intake electromagnetic valve 41 and the intake electromagnetic valve 41 has an intake valve body 42. When the intake valve body 42 touches to and is seated on the valve seat 28, the intake port 22 is closed to the combustion chamber 26. When the intake valve body 42 is apart from the valve seat 28, the intake port 22 connects to the combustion chamber 26.

Similarly, as shown in FIG. 1, the exhaust electromagnetic actuator 40 has an exhaust electromagnetic valve 43 and the exhaust electromagnetic valve 43 has an exhaust valve body 44. When the exhaust valve body 44 touches to and is seated on the valve seat 30, the exhaust port 24 is closed to the combustion chamber 26. When the exhaust valve body 44 is apart from the valve seat 30, the exhaust port 24 connects to the combustion chamber 26.

Figure 2:
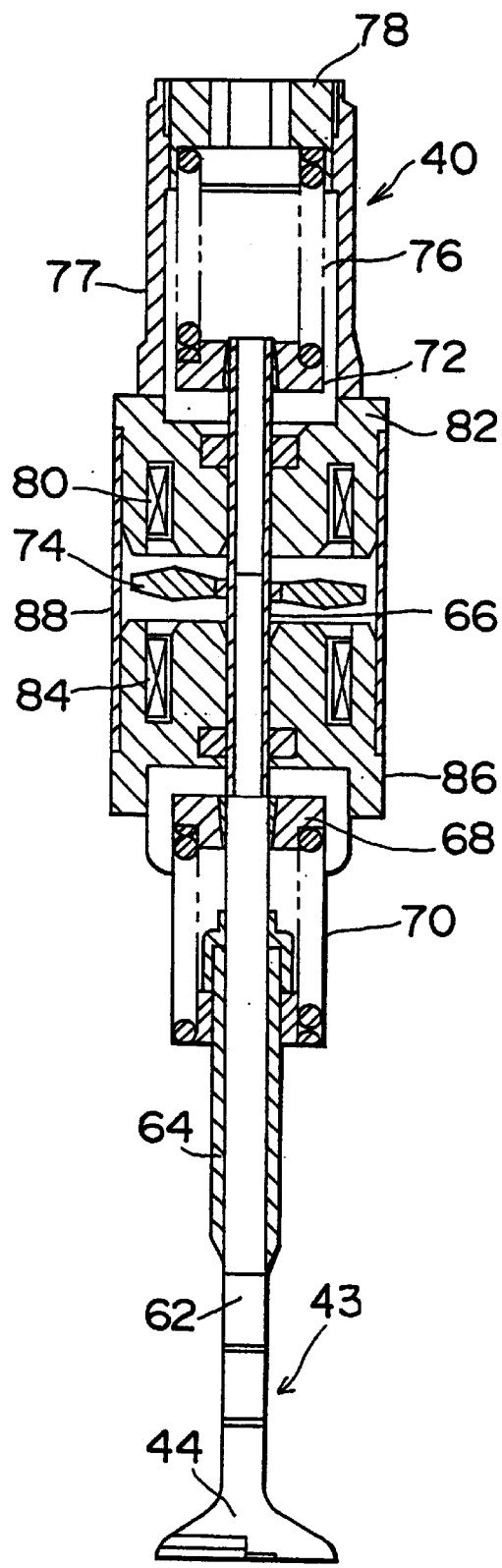
FIG. 2 is a magnified cross-sectional view of an exhaust electromagnetic actuator operated by the valve driving apparatus.

FIG. 2 shows a magnified view of the exhaust electromagnetic actuator 40. Referring to FIG. 2, the exhaust electromagnetic actuator 40 has an exhaust electromagnetic valve 43. A lower part of the exhaust electromagnetic valve 43 is an exhaust valve body 44, and has a shape like a dish placed up-side-down. An upper part of the exhaust electromagnetic valve 43 is a valve stem 62, and has a shape like a long and slender bar.

The engine has an intake manifold 46, as shown in FIG. 1. The intake manifold 46 includes a plurality of pipes connecting a surge tank 48 to each intake port 22. In each pipe a fuel injection valve 50 is provided. The fuel injection valve 50 injects fuel into the pipe on the basis of command signal from the ECU 10.

An intake pipe 52 connects upstream to the surge tank 48. A throttle valve 54 is deposited in the intake pipe 52. An air cleaner 56 connects upstream to the intake pipe 52. Consequently, outside air filtered by the air cleaner 56 flows into the intake pipe 52. An exhaust manifold 58 connects to each exhaust port 24.

A crank angle sensor 60 is provided in the engine. An output signal from the crank angle sensor 60 is supplied to the ECU 10. The ECU 10 detects a crank angle CA and an engine revolution speed NE according to the output signal of the crank angle sensor 60.

In this embodiment of the present invention, the fuel injection from the fuel injection valve 50 is controlled to be cut in the case that an accelerator pedal is disengaged when the revolution speed NE is higher than a predetermined value. When the accelerator pedal is disengaged, that is the throttle valve 54 is closed, a high negative pressure occurs in the surge tank 48, the intake manifold 46, and the intake port 22 (hereinafter called the intake system as a whole) downstream from the throttle valve 54. Incidentally, a high negative pressure means that the difference from the atmospheric pressure is high and it is low as the absolute pressure. When the fuel injection is cut under the condition where an absolute value of negative pressure is high in the intake system, the pressure in the combustion chamber 26 is negative near the bottom dead center of the crank angle CA, because combustion does not occur in the combustion chamber 26. When the negative pressure occurs in the combustion chamber 26, an engine brake is generated by a pumping loss of the piston 18 in response to the negative pressure. In these ways, when the fuel injection cut control is executed, a negative pressure is generated in the combustion chamber 26 near the bottom dead center, then the engine brake is generated in response to the absolute value of the negative pressure.

Next, the structure and acting movement of the electromagnetic actuators 38, 40 is explained as follows. Since the electromagnetic actuators 38 and 40 have the same structure, only the electromagnetic actuator 40 is explained as a representative.

Referring to FIG. 2, the exhaust valve body 44 connects to the exhaust valve stem 62. The valve stem 62 is supported movable up-and-down in the direction of its axis by a valve guide 64 which is fixed to the cylinder head 20. An armature shaft 66 is coupled to the valve stem 62 at the upper part. The armature shaft 66 is shaped as a rod and made of non magnetic materials. At the upper end of the valve stem 62, a lower retainer 68 is fixed to the valve stem 62. Beneath the lower retainer 68, a lower spring 70 is deposited. The lower end of the lower spring 70 touches the cylinder head 20. The lower spring 70 applies an upward pushing force to the armature shaft 66 by way of the lower retainer 68 and the valve stem 62.

At the end of the armature shaft 66, an upper retainer 72 is fixed to the armature shaft 66. Above the upper retainer 72, an upper spring 76 is deposited. In the circumference of the upper spring 76, a cylindrical upper cap 77 is deposited surrounding the upper spring 76. An adjust bolt 78, which is coupled to the upper cap 77 by a screw, touches the upper end of the upper spring 76. The upper spring 76 applies a downward pushing force to the upper retainer 72, and the armature shaft 66, as shown in FIG.2.

An armature 74 is coupled to the armature shaft 66 in the middle of the armature shaft 66. The armature 74 is ring-shaped and made of soft magnetic materials. Above the armature 74, an upper coil 80 and an upper core 82 are provided. Furthermore, under the armature 74, a lower coil 84 and a lower core 86 are provided. The upper coil 84 and the upper core 86 are made of magnetic materials. The armature shaft 66 is supported in the center part of the upper core 82 and the lower core 86, being movable up-and-down. The upper coil 80 and the lower coil 84 connect to a drive circuit which is not shown. The drive circuit supplies an exciting current to the upper coil 80 and the lower coil 84 in response to the control signal from the ECU 10.

In the outer circumference of the upper core 82 and the lower core 86, an outer cylinder 88 is provided. The outer cylinder 88 holds the upper core 82 and the lower core 86 a predetermined distance apart. The aforementioned upper cap 77 is fixed to the upper surface of the upper core 82. The adjust bolt 78 adjusts the armature 74 so that the armature 74 is positioned in the middle between the upper core 82 and the lower core 86.

In the exhaust electromagnetic actuator 40, the exhaust valve 43 seats on the valve seat 30, when the armature 74 reaches and touches the upper core 82. This condition is maintained by supplying a predetermined exciting current to the upper coil 80. Hereinafter, the condition where the exhaust valve 43 seats on the valve seat 30, is called 'full closed', and the position of the exhaust valve 43 is called 'full closed position'.

When the exciting current is cut to the upper coil 80 in the condition where the exhaust valve 43 is full closed, the electromagnetic force applied to the armature 74 vanishes. When the electromagnetic force 74 applied to the armature 74 vanishes, the armature 74 moves downward by the spring force of the upper spring 76. If an appropriate exciting current is supplied to the lower coil 84 when the armature 74 arrives at a predetermined position, the armature 74 is attracted to the lower core 86 by the electromagnetic force of the lower coil 84, then the exhaust valve 43 moves downward in FIG. 2.

When the above-mentioned attractive force is applied to the armature 74, energy loss by sliding resistance and/or remaining pressure of combustion is compensated by the attractive force, and the armature 74 moves downward with the armature shaft 66, the exhaust valve stem 62, and the exhaust valve body 44. The exhaust valve 43 continues to move until the armature 74 touches the lower core 86. Hereinafter, the condition where the armature 74 touches the lower core 86, is called 'full open', and the position of the exhaust valve 43 is called 'full open position'. This full open condition is maintained by supplying a predetermined exciting current to the lower coil 84.

When the exciting current applied to the lower coil 84 is cut off, in the condition where the exhaust valve 43 is kept at the full open position, the electromagnetic force applied to the armature 74 vanishes. When the electromagnetic force to the armature 74 is extinguished, the armature 74 moves upward in FIG. 2, by the spring force of the lower spring 70. If an appropriate exciting current is supplied to the upper coil 80 when the armature 74 reaches a predetermined position, the armature 74 is in this case attracted to the upper core 82 by the electromagnetic force of the upper coil 80. Then, the exhaust valve 43 moves upward in FIG. 2.

When the above-mentioned attractive force is applied to the armature 74, energy loss by sliding resistance and/or other is compensated by the attractive force, and the armature 74 moves upward with the the exhaust valve 43. The exhaust valve 43 moves until the armature 74 touches the upper core 82, that is the full closed position.

Concerning the exhaust electromagnetic actuator 40 as mentioned above, not only can the exhaust valve 43 be moved toward the full closed position by supplying a predetermined exciting current to the upper coil 80, but the exhaust valve 43 can also be moved toward the full open position by supplying a predetermined exciting current to the lower coil 84. Therefore, the exhaust valve 43 can be moved reciprocally between the full open and full closed positions, by supplying the exciting current alternately to the lower and upper coils 84, 80.

The intake electromagnetic actuator 38 including the intake valve 41 also behaves in the same manner as the aforementioned exhaust electromagnetic actuator 40. Consequently, according to this embodiment of the present invention, the intake valve 41 and exhaust valve 43 can be driven toward the full open and full closed position at any predetermined timing by supplying the control signal to the drive circuit from the ECU 10 so that the exciting current to the upper coil 80 and the lower coil 84 is alternately applied at the appropriate timing in the electromagnetic actuators 38, 40. (cf. The intake electromagnetic actuator 38 has the same number for the including parts as the actuator 40, except 41, 42.)

A rather big activating noise, however, occurs when the armature 74 collides with the lower core 86 or the upper core 82, in the case that the intake valve 41 and/or the exhaust valve 43 move at a high speed when the armature 74 touches the lower core 86 or the upper core 82. Furthermore, the armature 74 bounces back from the lower core 86 or the upper core 82, when the armature 74 collides the lower core 86 or the upper core 82 at the high speed. In this case, the extra exciting current must be supplied in order to attract the armature 74 again to the lower core 86 or the upper core 82. Consumed energy of the electromagnetic actuators 38, 40, then, increases inevitably. Consequently, it is desirable that the exciting current applied to the lower and upper coils 84, 80 is controlled so that the intake and exhaust valves 41, 43 move at a slow speed when they reach the full open and full closed positions.

Figure 3:
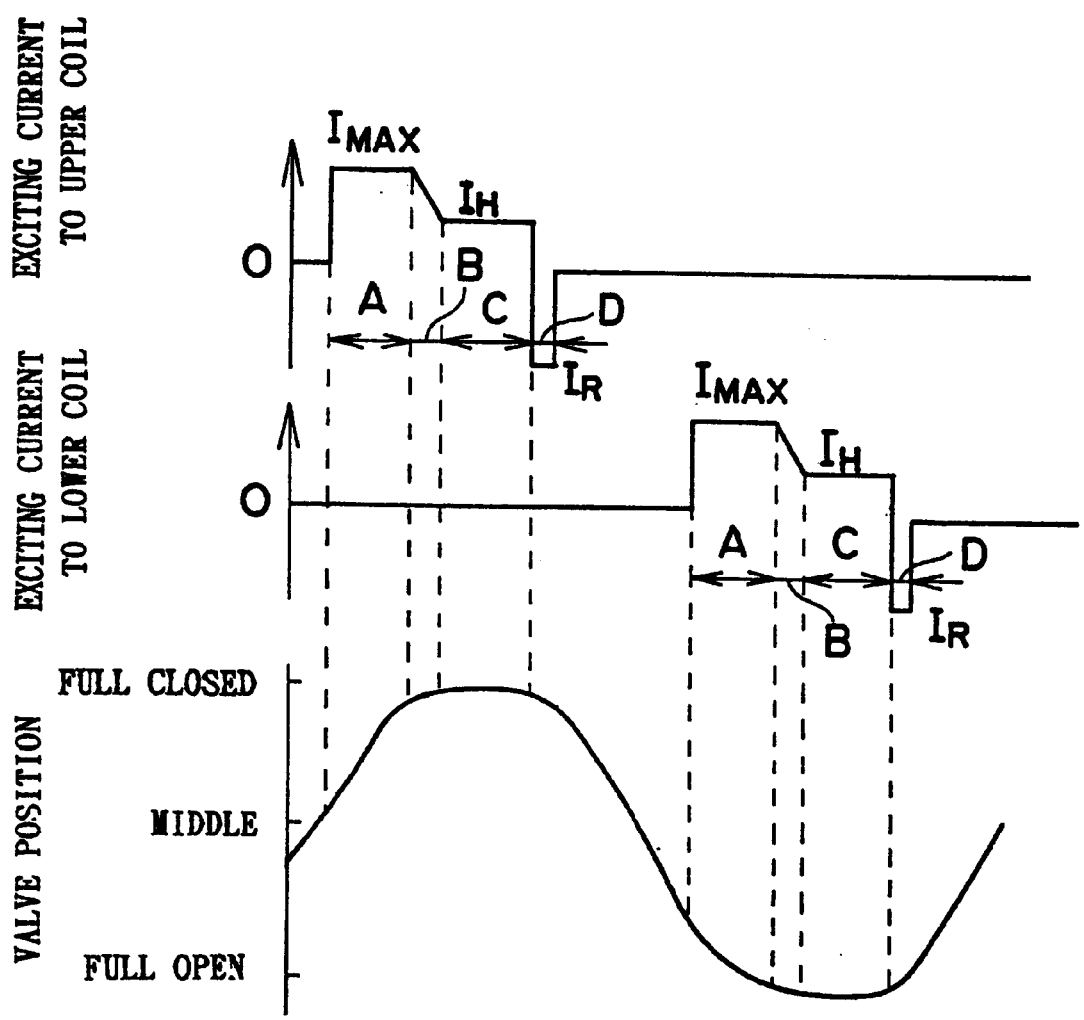
FIG. 3 is a graph showing characteristics of exciting current to an upper coil and a lower coil, and showing the position of the exhaust electromagnetic valve according to the first embodiment of the present invention.

From the above-mentioned viewpoint, the exciting current supplied to the upper coil 80 in order to drive the valves 41, 43 open-closed is shown, responding to elapsed time, in the upper graph of FIG. 3. The exciting current supplied to the lower coil 84 is also shown in the middle graph in FIG. 3. Furthermore, the valve position of the intake valve 41 or exhaust valve 43 corresponding to the exciting currents of the upper and lower coils is shown in the bottom graph of FIG. 3.

As shown in the top figure of FIG. 3, the exciting current applied to the upper coil 80 is kept constant at the value of $I_{MAX}$ (called attracting current) during a predetermined interval A, when the valve 41 or 43 moves from the full open position to the full closed position. After the interval A, the attracting current $I_{MAX}$ begins to decrease, when the valve 41 or 43 nearly reaches the full closed position, and becomes the value of $I_H$ (called holding current) during a changing interval B. After the changing interval B, the holding current $I_H$ which is lower than the attracting current $I_{MAX}$ is maintained during a predetermined interval C. When the valve 41 or 43 is indicated to be open, a negative value of the exciting current $I_R$ (called canceling current), which is opposite against the attracting current $I_{MAX}$ and the holding current $I_H$, is kept in a predetermined interval D. Incidentally, the interval D, in which the canceling current is $I_R$ is supplied, is set so that the remaining electromagnetic field applying the armature 74 can be canceled.

Similarly, as shown in the middle graph of FIG. 3, the exciting current applied to the lower coil 84 is kept constant value $I_{MAX}$ (also called attracting current) during a predetermined interval A, when the valve 41 or 43 moves from the full closed position to the full open position. After the interval A, the attracting current $I_{MAX}$ begins to decrease toward a holding current $I_H$ during a changing interval B. After the changing interval B, the holding current $I_H$ is maintained during a predetermined interval C. When the valve 41 or 43 is indicated to be closed, the canceling current $I_R$ is kept in a predetermined interval D.

The ECU 10 supplies the above-mentioned current to the upper coil 80 and the lower coil 84 at the synchronizing timing to the crank angle CA, on the basis of the output signal of the crank angle sensor 60. Consequently, the intake valve 41 and exhaust valve 43 can be driven open or closed at the appropriate timing, synchronizing the operation of the engine.

Figure 4:
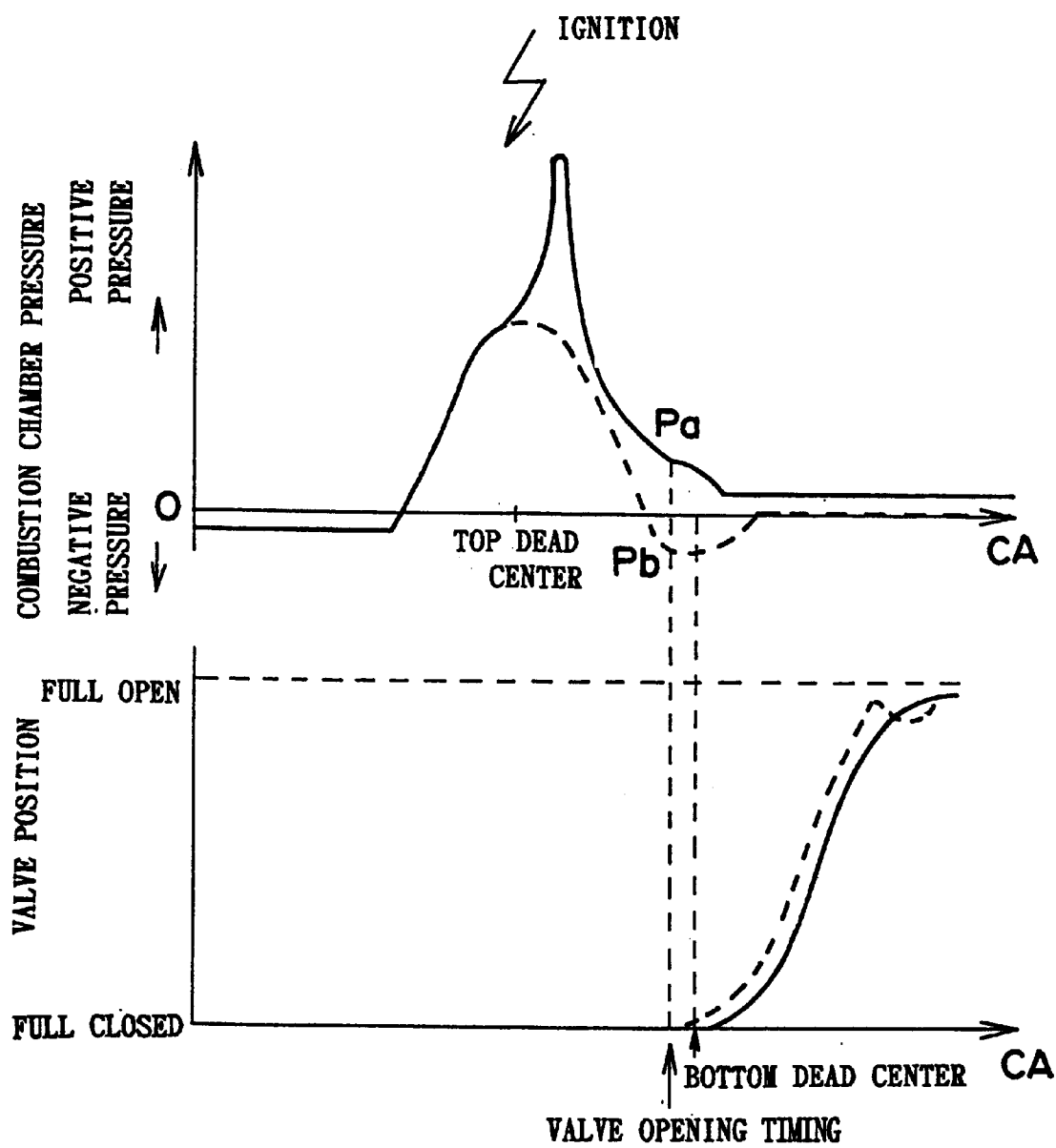
FIG. 4 is a graph showing a combustion chamber pressure and the valve position versus a crank angle of the internal combustion engine.

As mentioned above, when the accelerator pedal is disengaged at a high revolution speed of the engine, the fuel injection cut control is executed. The negative pressure, then, occurs in the combustion chamber 26 near the bottom dead center of the crank angle CA. The upper graph in FIG. 4 shows pressure in the combustion chamber versus the crank angle CA. The solid line shows the pressure in the case that the fuel injection cut control is not executed, that is in the normal operation, and the dotted line shows the pressure in the case that the fuel injection cut control is executed. In the lower graph in FIG. 4, the solid line shows the position of the exhaust valve 43 when it moves from the full closed position toward the full open position in the normal operation of the engine, and the dotted line shows the position of the exhaust valve 43 in the case that the same value of the exciting current as in the normal driving condition (where the fuel is injected into the combustion chamber 26) is applied.

As shown by the solid line in the upper graph of FIG. 4, the combustion chamber pressure becomes very high by the ignition near the top dead center when the operation of the engine is normal. Even at the bottom dead center, the combustion chamber pressure is maintained positive because the positive pressure remains in the combustion chamber 26. As shown by the dotted line in the upper graph of FIG. 4, the combustion chamber pressure only changes by expansion and compression in the combustion chamber 26, the combustion chamber pressure decreases to the negative pressure near the bottom dead center.

Referring to the lower graph in FIG. 4, the exhaust valve 43 begins to open near the bottom dead center. Corresponding to this, the combustion chamber pressure is positive Pa at the opening timing of the exhaust valve 43, as shown by the solid line in the upper graph in FIG. 4, in the normal driving condition, therefore the attracting force is not applied to the exhaust valve 43 caused by the combustion chamber pressure. Therefore, the moving speed of the exhaust valve 43 is restrained low when it reaches the full open position, as shown in the lower graph of FIG. 4, and problems of the bouncing back or activating noise of the armature 74 can be avoided.

On the other hand, during the fuel injection cut control, the combustion chamber pressure is negative Pb when the exhaust valve 43 is the opening timing, as shown by the dotted line in the upper graph of the FIG. 4. Consequently, if the exhaust valve 43 is driven to open at the same timing as the normal operation of the engine when the fuel injection cut control is executed, the force in the direction to open the exhaust valve 43 is applied by the negative pressure of the combustion chamber 26. Therefore, the force caused by the negative pressure of the combustion chamber 26 becomes surplus, when the same value of the exciting current as in the normal driving condition is applied to the lower coil 84 in the middle graph of FIG. 3.

Thus, the armature 74 moves and touches the lower core 86 at high speed, when the exhaust valve 43 reaches the full open position and the exhaust valve 43 bounces back from the full open position as shown in the lower graph of FIG. 4. In this case, it is necessary that the excess exciting current is supplied to the lower coil 84 in order to attract again the armature 74 to the lower core 86, therefore, the consumed energy increases and the noise problem occurs because the armature 74 collides with the lower core 86 at high speed, as mentioned above. Furthermore, when the armature 74 collides with the lower core 86 at high speed, a friction wear of both parts and/or other parts might occur, because impact force is applied to parts of the exhaust electromagnetic actuator 40.

In this embodiment, however, the above-mentioned trouble can be avoided, because the electromagnetic force in the closing direction of the closed position is added to the armature 74 when the exhaust valve 43 is opening, during the fuel injection cut control.

Figure 5:
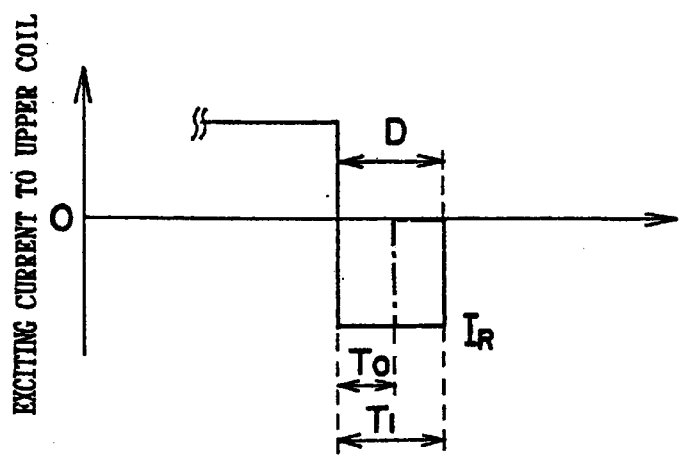
FIG. 5 is a graph showing a characteristic of exciting current to an upper coil, according to the first embodiment.

FIG. 5 shows the magnified view of the wave of the interval D in the top graph of FIG. 3, that is, canceling current $I_R$ which is supplied to the upper coil 80 of the exhaust electromagnetic actuator 40 when the exhaust valve 43 begins to open from the full closed position in the fuel injection cut control. The canceling current $I_R$ in the normal driving condition is shown as the chain line in FIG. 5.

As shown in FIG. 5, the interval T1 during which the canceling current $I_R$ is supplied in the fuel injection cut control, is longer than the interval T0 in the normal driving condition. As mentioned above, the interval D=T0 in the normal driving condition is set so that the remaining magnetism on the armature 74 can be erased just during the interval T0. Since the interval D is set T1 which is longer than T0 in this embodiment, the canceling current $I_R$ continues to be supplied to the upper core 82, even after the remaining magnetism on the armature 74 is erased. The electromagnetic force is furthermore applied between the armature 74 and upper core 82 by this exciting current $I_R$ during the time between (T1–T0). Therefore, the opening force of the exhaust valve 43 caused by the negative pressure in the combustion chamber 26 can be canceled. Accordingly, in the fuel injection cut control the armature 74 can be prevented from colliding with the lower core 86 at high speed, and the colliding noise which occurs when the armature 74 runs against the lower core 86 can be restrained. Moreover, the consumed energy of the exhaust electromagnetic actuator 40 can be saved, because it is not necessary that the armature 74 is again attracted to the lower core 86 after the armature 74 bounces back from the lower core 86.

Incidentally, the negative pressure in the combustion chamber 26 is certainly obtained in the fuel injection cut control, because the opening timing of the exhaust valve 43 in the fuel injection cut control is the same as one in the normal driving condition, in this embodiment. As mentioned above, the engine brake of the vehicle occurs on the basis of the negative pressure of the combustion chamber 26, when the fuel injection cut control is executed. Consequently, the aforementioned advantages can be attained while still securing the engine brake in the fuel injection cut control.

In the fuel injection cut control, the greater the absolute value of the negative pressure in the combustion chamber 26 is, the greater the opening force applied to the exhaust valve 43 is.

Furthermore, the higher the revolution speed NE of the engine is, the greater the absolute value of the negative pressure, in the fuel injection cut control. Consequently, by estimating the negative pressure of the combustion chamber 26 on the basis of the revolution speed NE and making the interval D (during D the exciting current $I_R$ is supplied) longer according to the increase of the absolute value of the negative pressure, the collision noise of the armature 74 can be prevented from increasing and the consuming electric power caused by the bouncing of the armature 74 can be restrained. For example, even when the revolution speed NE is high and the absolute value of the negative pressure is large, the above-mentioned merits can be obtained by setting the longer interval D according to the condition of the revolution speed NE and the negative pressure.

Incidentally, in this embodiment the force to the exhaust valve 43 in the direction of the closed position is applied by elongating the interval D so that the force to the exhaust valve 43 in the direction of the open position responding to the negative pressure is canceled.

Figure 6:
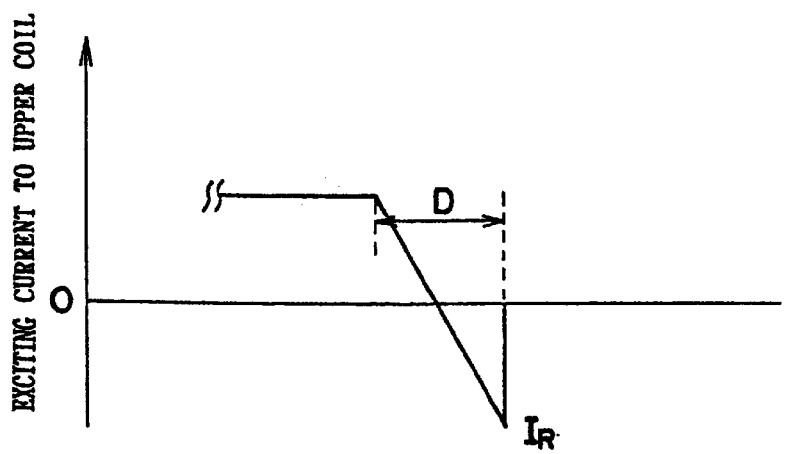
FIG. 6 is a graph showing a characteristic of exciting current to an upper coil, according to a modified embodiment of the first embodiment.
Figure 7:
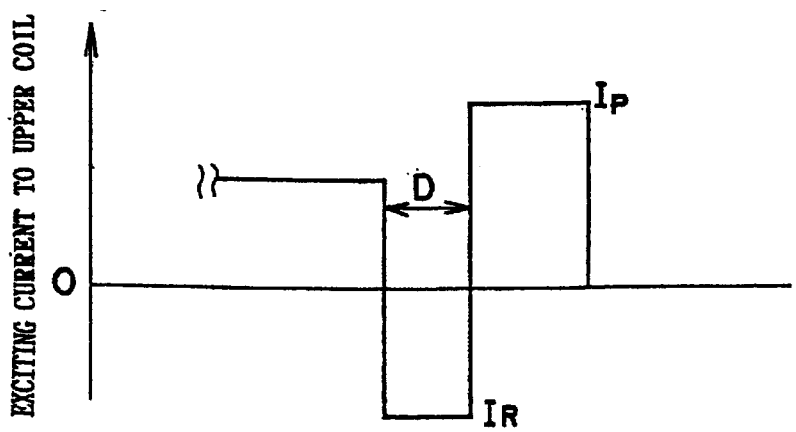
FIG. 7 is a graph showing a characteristic of exciting current to an upper coil, according to the other modified embodiment of the first embodiment.

The exciting current shown in the graph FIG. 6 or FIG. 7 can also be adopted. FIG. 6 shows the exciting current which is controlled to decrease gradually. In this case, the electromagnetic attracting force between the armature 74 and the upper core 82 is greater than the force in the case where the exciting current decreases step-wise, because the electromagnetic force between the armature 74 and the upper core 82 gradually reduces. Therefore, the opening force applied to the exhaust valve 43 caused by the negative pressure in the combustion chamber 26 can be canceled by the increase of the closing force applied to the exhaust valve 43.

FIG. 7 shows the wave of the exciting current which is supplied the upper coil 80 by the positive current $I_P$ after being supplied by the negative current $I_R$. In this case, the electromagnetic attracting force is applied between the armature 74 and the upper core 82 by the positive current $I_P$. The closing force applied to the armature 74 increases by the value of the above-mentioned electromagnetic force.

Accordingly, the opening force applied to the exhaust valve 43 caused by the negative pressure in the combustion chamber 26 can be canceled.

In this embodiment, the ECU 10 supplies the canceling current $I_R$ which is shown in FIG. 5, 6 or 7 to the upper coil 80. This means that a control means for controlling the electromagnetic force applied to the armature is realized.

Incidentally, in this embodiment the current direction of the canceling current $I_R$ is opposite to the direction of the attracting current $I_{MAX}$, however, it is not necessarily limited to this case, and the canceling current $I_R$ can also be zero. In this case, in the fuel injection cut control the wave of the exciting current $I_R=0$ in FIG. 6 or 7 is given, when the armature 74 is taking apart from the upper core 82.

Next, the second embodiment is explained. In the second embodiment, the opening valve timing of the exhaust valve 43 in the fuel injection cut control is changed from the condition in the normal driving control, in the same system as shown in FIGS. 1 and 2.

Figure 8:
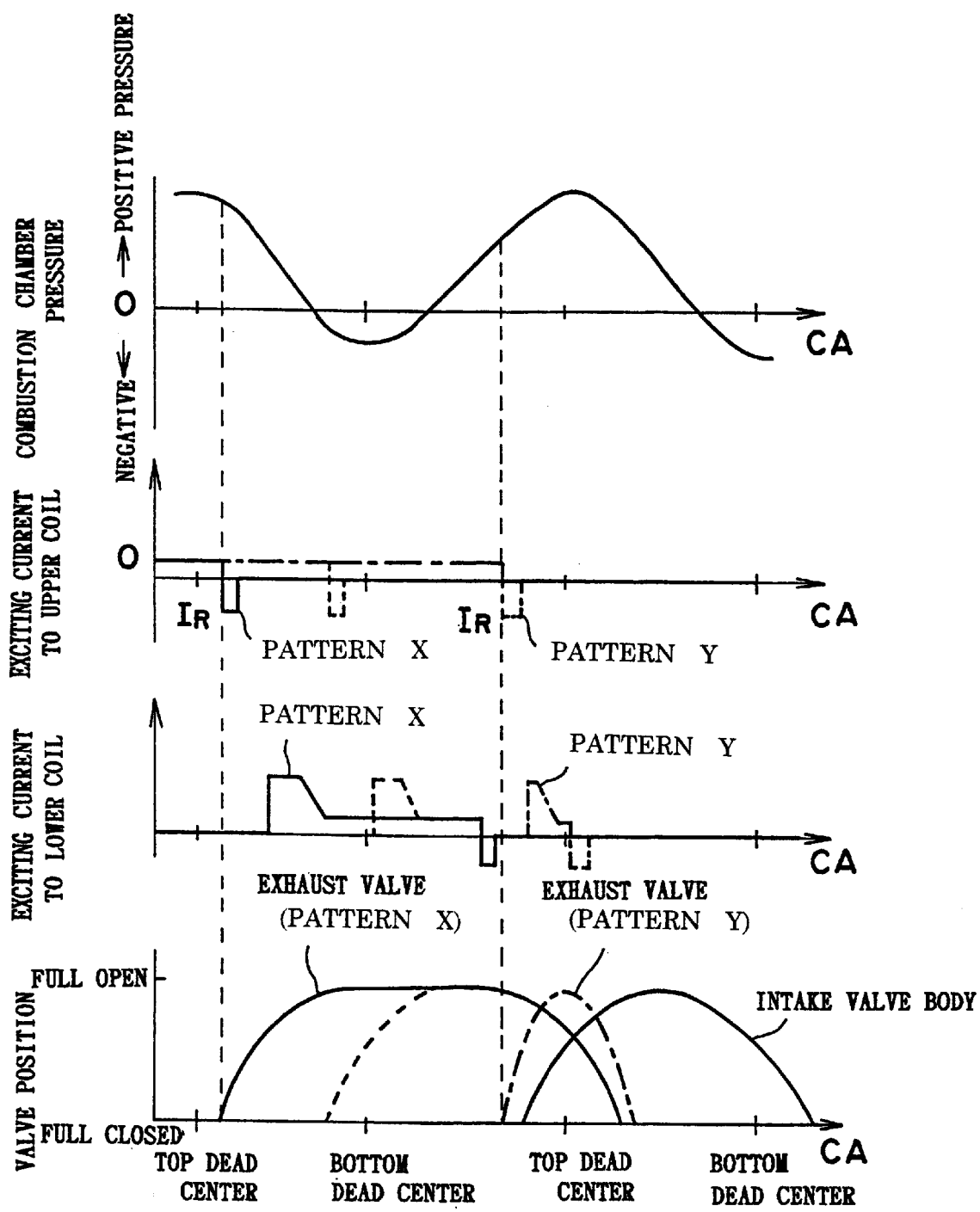
FIG. 8 is a graph showing a pressure of a combustion chamber, an exciting current to an upper coil and an exciting current of a lower coil, and showing a position of an electromagnetic valve according to the second embodiment of the present invention.

The upper graph in FIG. 8 shows the pressure in the combustion chamber 26 vs. the crank angle CA of the engine in the fuel injection cut control, in the same manner as the above-mentioned upper graph in FIG. 4. The characteristics is, however, illustrated in the upper graph in FIG. 8 in the hypothesis that the exhaust valve 43 is kept at the full closed position.

The second and third graphs from the top in FIG. 8 show the exciting current to the upper coil 80 and to the lower coil 84 of the exhaust electromagnetic actuator 40. In these two graphs the exciting current patterns X and Y are shown respectively by the solid line and the chained line, and the exciting current supplied to the upper and lower coils 80, 84 in the normal driving condition is shown by the dotted line.

In the lower graph of FIG. 8, the solid line shows the position of the exhaust valve 43 given by the exciting current of the pattern X, the chained line shows the position given by the pattern Y, and the dotted line shows the position in the normal driving condition.

In the fuel injection cut control, as shown in FIG. 8, the opening timing of the exhaust valve 43 is more advanced (the pattern X) or more delayed (the pattern Y) than in the normal driving control. Consequently, the exhaust valve 43 is prevented from opening in the condition where the negative pressure occurs in the combustion chamber 26. Referring to the upper graph of FIG. 8, in the fuel injection cut control, the combustion chamber pressure is negative near the bottom dead center, and on other hand the pressure is positive in the other range. In this embodiment, the exciting current $I_R$ is supplied to the upper coil 80 to open the exhaust valve 43 (shown in the second graph of FIG. 8) in the condition, where the combustion chamber pressure is positive or is slightly negative such as the armature 74 can not bounce back against the lower core 86. Accordingly, the exhaust valve can be prevented from being forced to open by the negative pressure of the combustion chamber 26. Therefore, it can be avoided that the actuating noise of the exhaust electromagnetic valve 40 increases and the armature 74 bounces back from the lower core 86.

Incidentally, in this embodiment the aforementioned advantages are obtained by changing the opening timing of the exhaust valve 43. That is, this does not require the armature 74 to be given the electromagnetic force in order to cancel the force caused by the negative pressure of the combustion chamber 26. Therefore, the consumed electric power of the exhaust electromagnetic actuator 40 can be restrained.

In the second embodiment, the ECU 10 supplies the exciting current shown pattern X or Y in FIG. 8 to the upper coil 80 and the lower coil 84 in the fuel injection cut control, thus, a valve timing changing means is realized.

Next, the third embodiment is explained. In the third embodiment, in the fuel injection cut control, the force to the exhaust valve 43 in the opening direction caused by the negative pressure in the combustion chamber 26 is canceled by means of restraining or nullifying the electromagnetic force in the opening direction to the armature 74, when the exhaust valve 43 begins to open, in the same system as shown in FIGS. 1 and 2.

Figure 9:
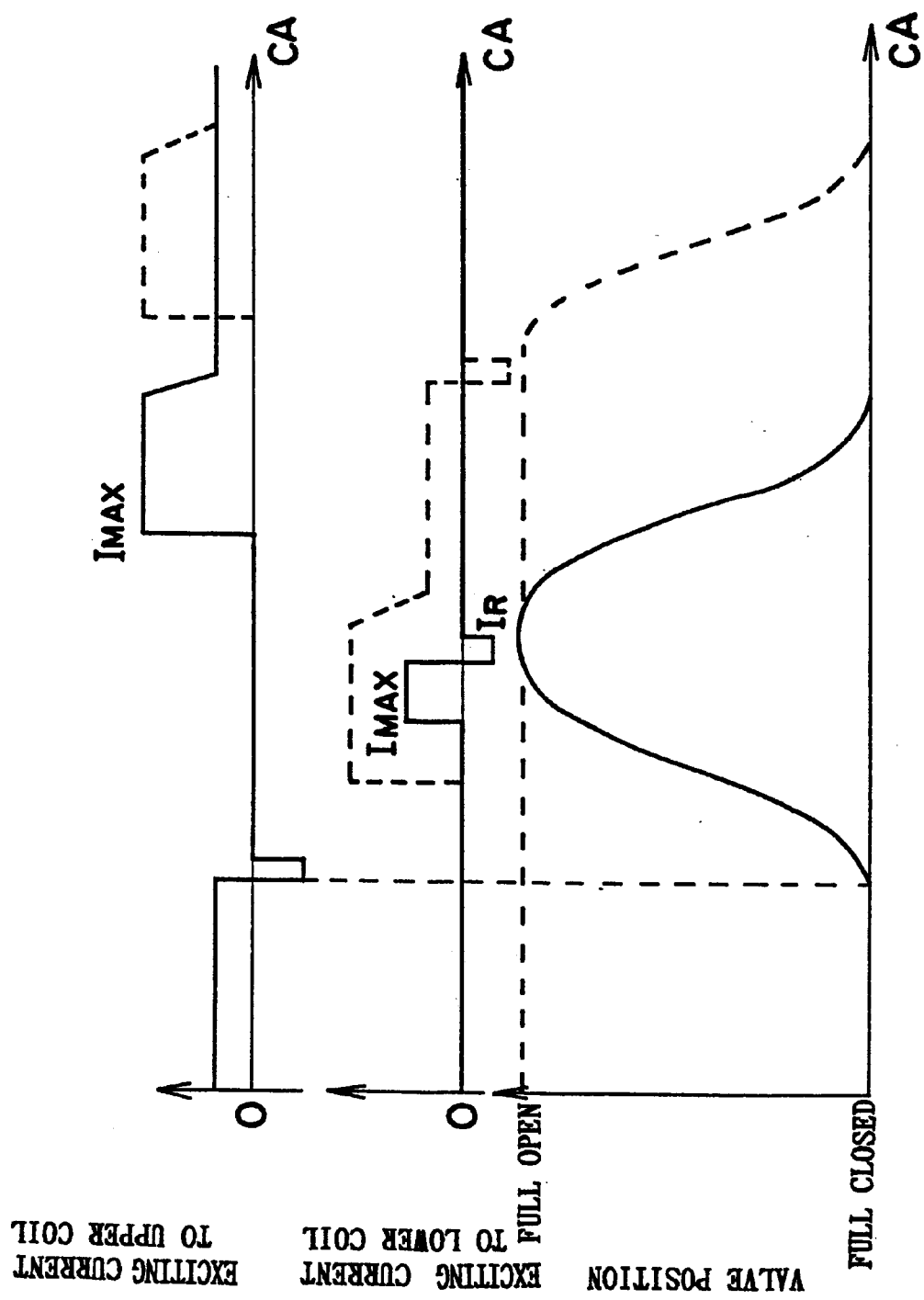
FIG. 9 is a graph showing an exciting current to an upper coil and an exciting current to a lower coil, and showing a position of an electromagnetic valve according to the third embodiment of the present invention.

The exciting current supplied to the upper coil 80 of the exhaust electromagnetic actuator 40 is shown in the upper graph in FIG. 9. The exciting current to the lower coil 84 is shown in the middle graph, and the position of the exhaust valve 43 is shown in the lower graph. The solid line shows the fuel injection cut control, and the dotted line shows the normal driving control.

With reference to the middle graph of FIG. 9, in the fuel injection cut control, the supplying timing of the attracting current $I_{MAX}$ to the lower coil 84 in the opening process of the exhaust valve 43 is delayed comparing with the timing in the normal driving control. Furthermore, the attracting current $I_{MAX}$ is restrained to be lower. In this embodiment, the canceling current $I_R$ is immediately supplied without supplying the holding current $I_H$, and by advancing the beginning timing of supplying the attracting current $I_{MAX}$ to the upper coil 80, the exhaust valve 43 is forced to move toward the closed position without being kept at the full open position.

Since the timing of supplying the attracting current Imax to the lower coil 84 is delayed and the value $I_{MAX}$ is limited to be lower, the kinetic energy of the exhaust valve 43 is decreased. By the decrease of the kinetic energy, the high speed colliding noise between the armature 74 and the lower core 86 can be reduced and it can be avoided that the armature 74 bounces back from the lower core 86.

Figure 10:
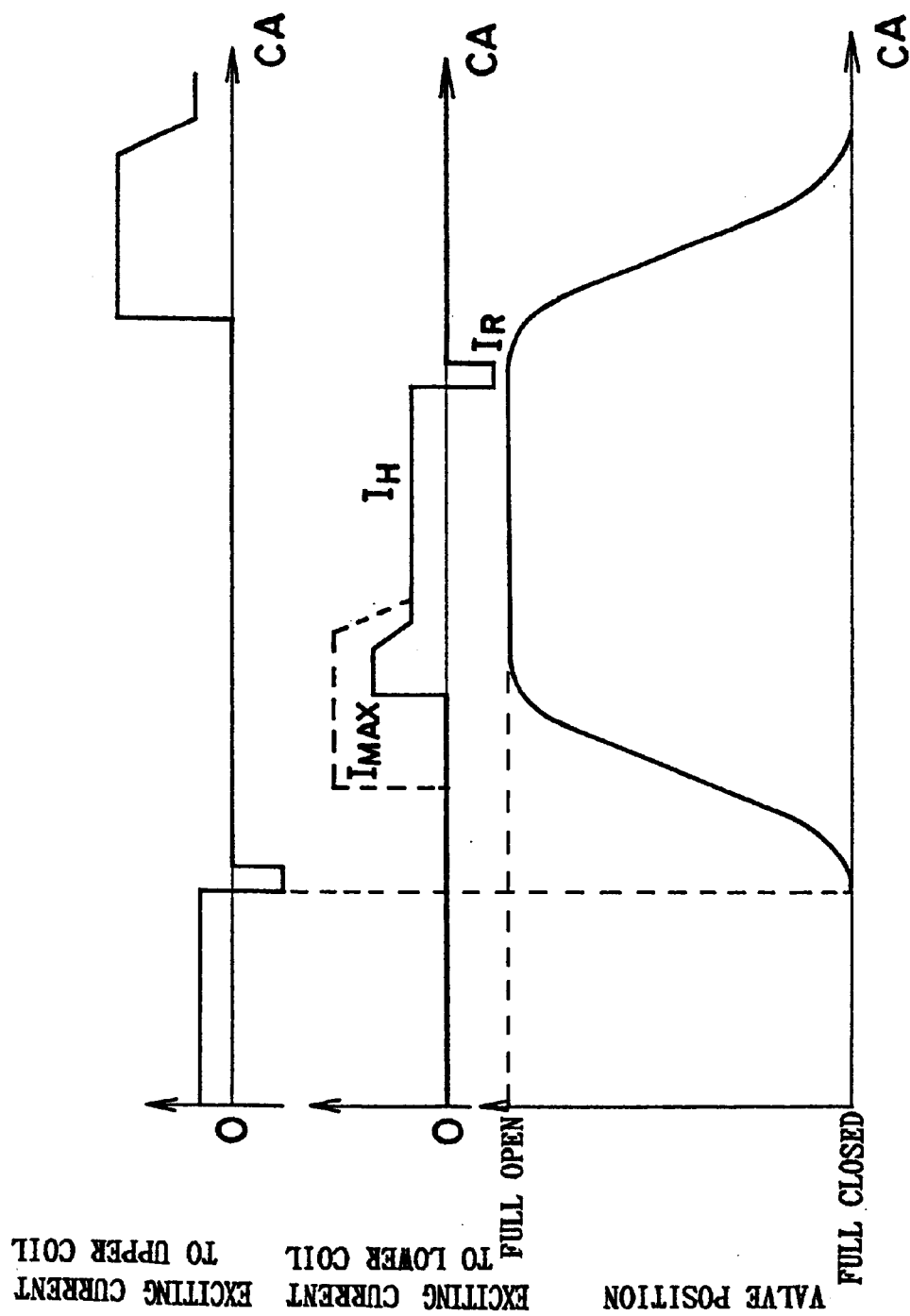
FIG. 10 is a graph showing an exciting current to an upper coil and an exciting current to a lower coil, and showing a position of an electromagnetic valve according to a modified embodiment of the third embodiment.

Next, the modified example of the third embodiment is explained. The upper graph of FIG. 10 shows the exciting current supplied to the upper coil 80 of the exhaust electromagnetic actuator 40 when the exhaust valve 43 begins to open in the fuel injection cut control. The middle graph depicts the exciting current supplied to the lower coil 84, and the lower graph shows the position of the exhaust valve 43. In these graphs the solid lines indicate the waves in the fuel injection cut control, and the dotted lines indicate the waves in the normal driving control.

In this case, since the timing of supplying the attracting current $I_{MAX}$ to the lower coil 84 is delayed and the value of the attracting current $I_{MAX}$ is restrained to be low in the same manner as in the aforementioned third embodiment, the force applied to the exhaust valve 43 in the opening direction caused by the negative pressure in the combustion chamber 26 is canceled. Furthermore, since the holding exciting current $I_H$ to the lower coil 84 is supplied following the supply of the attracting current $I_{MAX}$, the exhaust valve 43 can be kept at the full open position.

In these third and modified embodiments, in the fuel injection cut control, the beginning timing of supplying the attracting current $I_{MAX}$ to the lower coil 84 is delayed and the attracting current $I_{MAX}$ is restrained low, and consequently the kinetic energy given to the armature 74 is reduced. The invention, however, is not limited to the above-mentioned embodiments. For example, the method of only delaying the supplying timing of the attracting current $I_{MAX}$ or the method of only restraining the attracting current $I_{MAX}$ to be low, can be adopted. Moreover, if the absolute value of the negative pressure of the combustion chamber 26 is large, the method that the exciting current supplied to the lower coil 84 is zero can be available, in this case the exhaust valve 43 is opened by the force caused by the negative pressure of the combustion chamber 26.

Incidentally, when the absolute value of the negative pressure in the combustion chamber 26 is large and the armature 74 moves toward the lower core 86 at the high speed, even if the attracting current $I_{MAX}$ is not supplied to the lower coil 84, the problems of the colliding noise between the armature 74 and the lower core 86 or the bounce back of the armature 74 can not be avoided completely. From this point of view, the methods explained in the third and modified embodiments are effective when the absolute value of the negative pressure in the combustion chamber 26 is rather low.

In the above-mentioned third and its modified embodiments, since the exciting current shown in the middle graph of FIG. 9, or in the middle graph of FIG. 10 is supplied to the lower coil 84 in the fuel injection cut control, a reducing control means for controlling the electromagnetic force applied to the armature 74 is realized.

Next, the fourth embodiment is explained. In this embodiment, the ECU maintains the supply of the holding current $I_H$ to the upper coil 80 of the exhaust electromagnetic actuator 40 in the fuel injection cut control, so that the exhaust valve 43 is kept at the full closed position. Accordingly, the exhaust valve 43 does not move toward the opening side in the fuel injection cut condition. Therefore, the aforementioned problems caused by the collision between the armature 74 and the lower core 86 are avoided. Furthermore, it is not necessary to supply the attracting exciting current $I_{MAX}$ to the lower coil 84, because it is enough to supply the holding current $I_H$ to the upper coil 80 of the exhaust electromagnetic actuator 40 in order to hold the exhaust valve 43 at the full closed position. Incidentally, in this case, the engine brake becomes rather low by the fact that the exhaust valve 43 is kept at the full closed position. Consequently, in this embodiment more saving of electric power for the exhaust electromagnetic actuator 40 can be achieved than in the third or its modified embodiment.

The exhaust valve 43 is kept at the full closed position in the fourth embodiment, however, it is not limited to this method. That is, it is also available that the exhaust valve 43 is kept at the full open position by supplying the holding current $I_H$ to the lower coil 84. Moreover, it is also available that the exhaust valve 43 is held at the neutral position by supplying the exciting current neither to the upper coil 80 nor the lower coil 84 when the fuel injection cut control is executed. In this case, more electric power saving can be attained.

A suspending means for suspending a moving of the exhaust valve 43 is realized by the fact that the ECU 10 maintains the supply of the holding current $I_H$ to the upper coil 80 or the lower coil 84 or suspends the supply of the exciting current to both coils 80 and 84, in the fuel injection cut control.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A valve driving apparatus for driving an exhaust valve, using electromagnetic force, provided in an internal combustion engine, said exhaust valve being movable between an open position and a closed position, said valve driving apparatus comprising:

an armature coupled with said exhaust valve;

an electromagnetic coil for generating an electromagnetic force exerted on said armature;

a valve spring for generating a force exerted on said exhaust valve; and a control means for controlling the electromagnetic force applied to said armature in the direction of the closed position of said exhaust valve when said exhaust valve is moving to the open position, in the case that combustion is suspended in the internal combustion engine.

2. The valve driving apparatus according to claim 1, wherein said control means supplies a canceling electric current for canceling an electromagnetic force exerted on said armature, for a longer interval when combustion is suspended in the internal combustion engine than when combustion is underway in the internal combustion engine.

3. The valve driving apparatus according to claim 1, wherein said control means gradually increases a canceling electric current for canceling the electromagnetic force exerted on said armature after gradually reducing an electric current for controlling the electromagnetic force exerted on said armature, when combustion is suspended in the internal combustion engine.

4. The valve driving apparatus according to claim 1, wherein said control means controls an electromagnetic force applied to said armature in the direction of the closed position when said exhaust valve is moving to the open position after supplying a canceling electric current for canceling the electromagnetic force exerted on said armature for an interval, in the case that combustion is suspended in the internal combustion engine.

5. A method for driving an exhaust valve having an open position and a closed position, the exhaust valve being associated with an internal combustion engine, and the exhaust valve being coupled to an armature, the method comprising the steps of:

driving an electric current through a coil, the coil generating an electromagnetic force exerted on the armature;

biasing the armature against the electromagnetic force; and controlling the electromagnetic force applied to the armature in the direction of the closed position of the exhaust valve when the exhaust valve moves toward the opening position in the case that combustion is suspended in the internal combustion engine.

6. The method according to claim 5, further comprising the step of:

supplying a canceling electric current for canceling the electromagnetic force applied to the armature, for a longer interval when combustion is suspended in the internal combustion engine than when combustion is underway in the internal combustion engine.

7. The method according to claim 5, further comprising the step of:

gradually reducing the electric current for reducing the electromagnetic force applied to said armature and after that gradually increasing a canceling electric current for canceling the electromagnetic force applied to said armature, when combustion is suspended in the internal combustion engine.

8. The method according to claim 5, further comprising the step of:

increasing an electromagnetic force applied to the armature in the direction to the closed position when the exhaust valve is moving to the open position after supplying a canceling electric current for canceling the electromagnetic force applied to the armature for an interval, in the case that combustion is suspended in the internal combustion engine.

* * * * *